United States Patent [19]

Kollar

[11] 4,413,901

[45] Nov. 8, 1983

[54] RECIRCULATING AUTOMATIC DOCUMENT FEEDER

[75] Inventor: Ernest P. Kollar, Boulder County, Colo.

[73] Assignee: International Business Machines Corporation, Armonk, N.Y.

[21] Appl. No.: 50,026

[22] Filed: Jun. 19, 1979

[51] Int. Cl.³ .................... G03G 15/04; B65H 1/04; B65H 31/00
[52] U.S. Cl. .................. 355/3 SH; 271/3.1; 271/37; 271/212; 414/37; 414/93; 414/95
[58] Field of Search ............ 271/3.1, 4, 212, 190, 271/37, 3, 120; 414/37, 93, 95; 355/3 SH, 14 SH

[56] References Cited

U.S. PATENT DOCUMENTS

| 3,396,966 | 8/1968 | Solheim | 271/212 |
| 3,499,710 | 3/1970 | Sahley | 271/3.1 X |
| 3,517,482 | 6/1970 | Beninger | 414/37 X |
| 3,565,420 | 2/1971 | Howard | 271/4 |
| 3,568,860 | 3/1971 | Rawlins | 271/212 X |
| 3,671,034 | 6/1972 | de Ridder | 271/212 X |
| 3,702,697 | 11/1972 | Leutwein et al. | 271/3 |
| 3,829,082 | 8/1974 | Hoyer | 271/4 |
| 3,831,781 | 8/1974 | Anikanov et al. | 414/93 X |
| 3,861,671 | 1/1975 | Hoyer | 271/4 X |
| 3,910,570 | 10/1975 | Bleau | 271/245 |
| 4,076,408 | 2/1978 | Reid et al. | 355/14 SH |
| 4,089,516 | 5/1978 | Colglazier et al. | 271/37 X |

FOREIGN PATENT DOCUMENTS

| 2229531 | 2/1973 | Fed. Rep. of Germany | 271/212 |
| 931918 | 7/1963 | United Kingdom | 414/93 |

Primary Examiner—Bruce H. Stoner, Jr.
Attorney, Agent, or Firm—Francis A. Sirr

[57] ABSTRACT

An electrophotographic copier having a recirculating automatic document feeder whereby a stack of original documents are top-fed, one at a time, to the copier's platen for copying, and after such copying, rejoin the stack by operation of means which cyclically lift the stack to enable the returning document to be deposited below the stack, and then lowers the stack to cause such a returned document to become the lowermost document of the stack.

11 Claims, 6 Drawing Figures

RECIRCULATING AUTOMATIC DOCUMENT FEEDER

DESCRIPTION

TECHNICAL FIELD

This invention concerns a recirculating automatic document feeder for placing an original document onto a copier's platen for copying.

BACKGROUND ART

The advantage of a recirculating automatic document feeder (RADF) is well known in the art. For example, one such advantage is the ability to recirculate a multi-sheet original document, making one copy per circulation, such that the copy output comprises a single stack of many collated copy sets without the necessity of providing an output multi-bin collator.

All known RADF's are bottom feed/top restack devices; that is, the original documents are fed off the bottom of a stack, and rejoin the stack, after copying, by being placed on top of the stack as the stack's topmost sheet. While bottom feeding is more difficult, the prior art inability to bottom stack has necessitated the bottom feed/top restack configuration found in the prior art.

Of course, when recirculation is not provided, it is relatively simple to provide the sheet feeding advantages of top feeding, and this has been done in the prior art.

In addition, it is known that in the broader art of article stacking per se, means such as side-disposed paddle wheels have been used to elevate a stack, and at the same time advance the paddles so as to form a platform for the next article. Thus, as the paddles continue to rotate, and articles continue to be fed, a stack of such articles is formed by bottom feeding.

Another known version of such a stacker per se is that of air-supporting a stack of cards so as to enable the insertion of a card at the bottom of the stack.

THE INVENTION

The general object of this invention is to provide a top feed/bottom restack recirculating automatic document feeder.

A further object is to achieve cyclic stack elevation to facilitate return of an article to the bottom of a stack of articles.

A further object is to achieve reliable single-sheet feed in a top feed/bottom restack recirculating automatic document feeder.

This invention specifically achieves these and other objects by the use of a combing wheel, top disposed, sheet feed means which is operable to reliably separate the top sheet of a stack of originals by virtue of a sheet shingling phenomenon. After a document has been copied, it is returned to a platform, under the then-elevated stack of original documents. Subsequently the stack is lowered onto the just-returned document. Preferably, the stack's top document is fed to the copier's platen while the stack is in the lowered position.

The foregoing and other features of this invention, as well as its advantages and applications, will be apparent from the following detailed description of the preferred embodiments which are illustrated in the accompanying drawing.

CROSS-REFERENCE TO RELATED PATENT APPLICATION

The claims of the present application dominate the copending and commonly assigned patent application of D. F. Colglazier and E. P. Kollar, Ser. No. 056,170, filed July 9, 1978.

DESCRIPTION OF THE PREFERRED EMBODIMENTS

Figure 1:
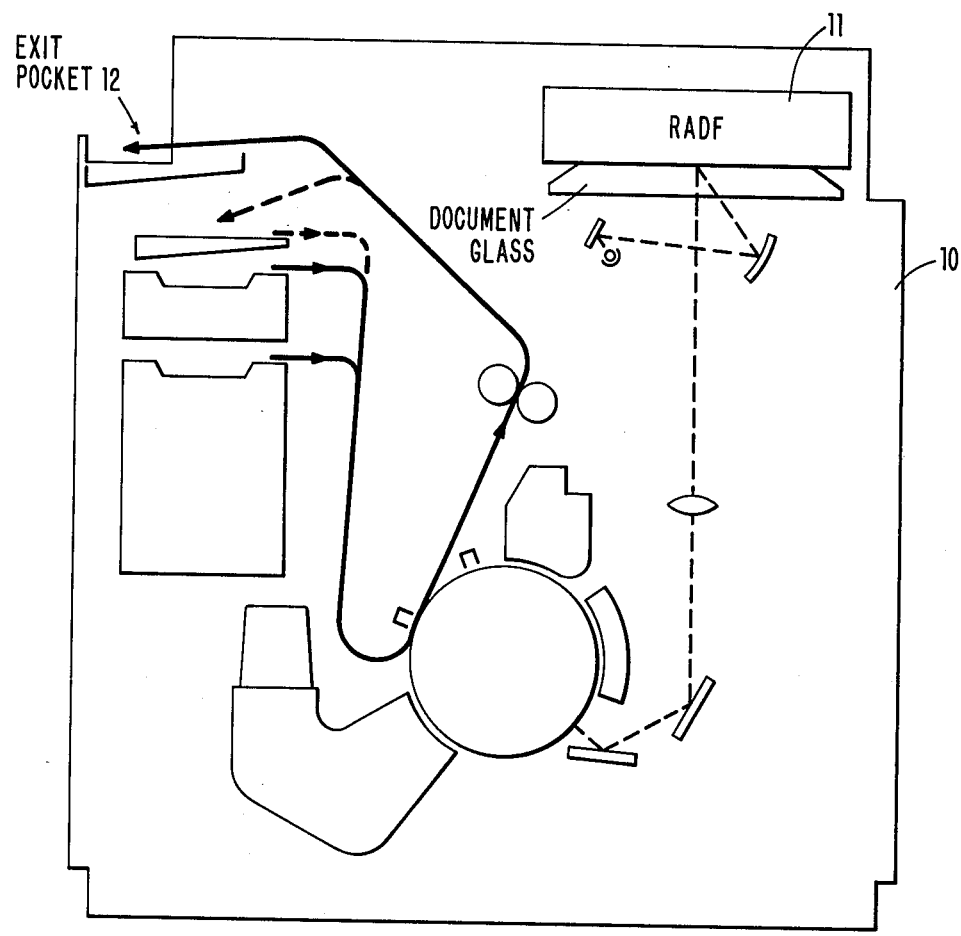
FIG. 1 shows a xerographic copier incorporating the recirculating automatic document feeder (RADF) incorporating the present invention.

With reference to FIG. 1, xerographic copier 10, which may be the Series III Copier/Duplicator, model 10, manufactured by International Business Machines Corporation, includes RADF 11 incorporating the present invention. As is well known by those of skill in the art, a multiple page original document is placed in RADF 11, and is recirculated a given number of times, for example 10 times. During each circulation of the original document, one simplex copy is made of each page. These simplex copies are stacked in exit pocket 12. Thus, after 10 recirculations, 10 collated sets reside in the exit pocket, in a single stack, awaiting manual separation.

While not pertinent to the present invention, sheet offsetting mechanisms are available for use with exit pocket 12, to physically offset each set from its upper and lower adjacent sets, for ease of manual separation.

In an alternate limitless-collation installation, not shown, the copier of FIG. 1 supplies its output copies to a two-module collator, each collator module having, for example, twenty bins. When the device of FIG. 1 is used with such a two-module collator, RADF is operated so as to make, for example, twenty copies of each page of the multipage original document, and to feed the copies, one to each collator bin of the first module. When the original document has been copied once, twenty copies per page, the first collator module contains twenty collated copy sets. The RADF now begins copying again, i.e. recirculates, and produces twenty more such sets in the second collator module, as the first module is manually unloaded. Thereafter, the first collator module is used as the second module is unloaded. This procedure continues until the needed "limitless" number of copy sets are made.

As can be seen, the copier of FIG. 1 includes a document glass, or platen, which comprises a generally horizontal platform adapted to receive an original document, and to hold it stationary where it is viewable from the underside, for copying.

Figure 2:
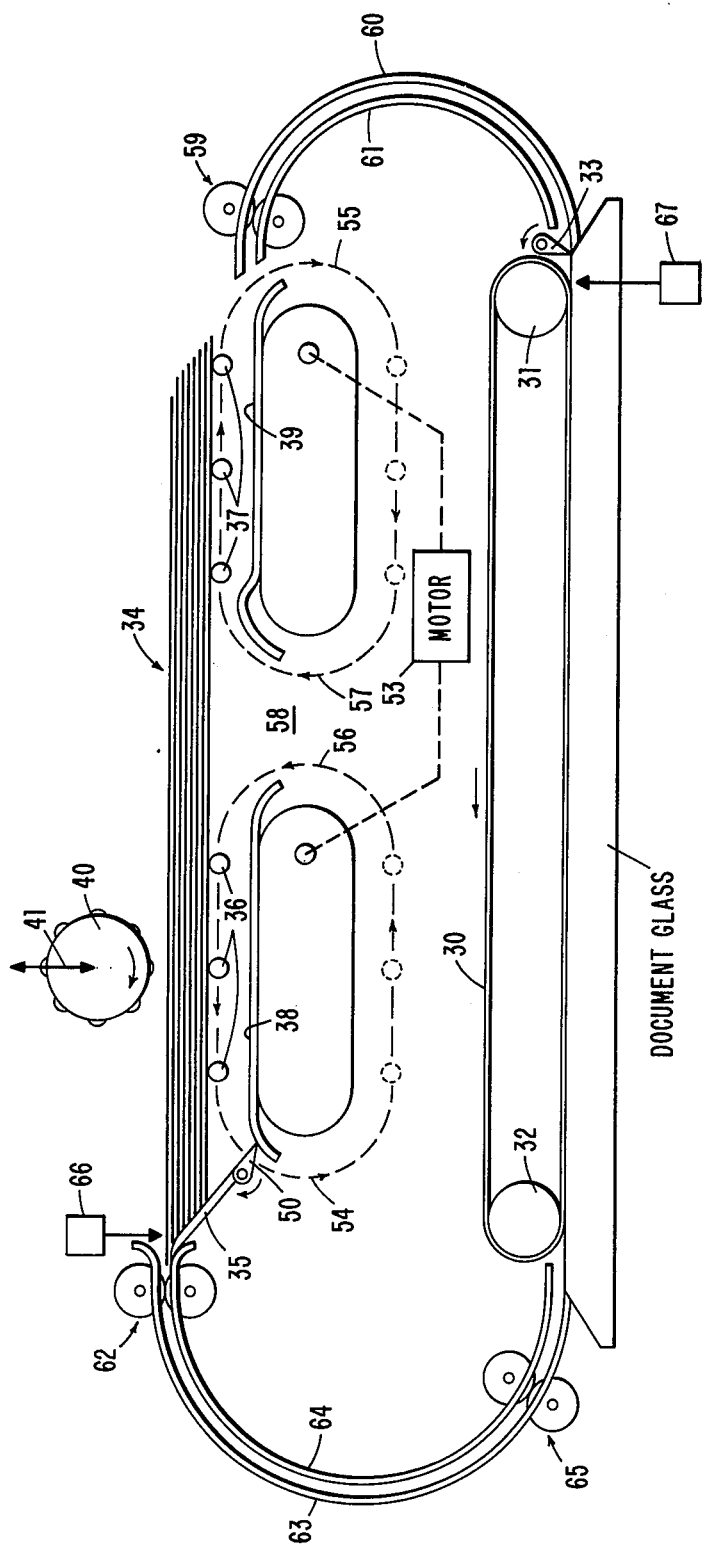
FIG. 2 is a front view of a first embodiment of the present invention.

With reference to FIG. 2, this figure is a front view of FIG. 1's RADF 11. As shown, the copier's document glass cooperates with an endless original-document transport belt 30. Transport belt 30 of FIG. 2 step-moves only in a counterclockwise direction, about driven pulley 31 and idler pulley 32. The first movement step causes an original document's leading, right-hand edge to register against now-closed and movable stop gate 33. The belt then stops, and the document is copied, either once or a number of times, as described in relation to FIG. 1. The next step movement of belt 30 operates to cause the just-copied document to be returned to the bottom of stack 34. At the same time, the top document of stack 34 is transported so as to be registered against stop gate 33 for copying, replacing the just-copied document.

The construction and arrangement for accomplishing step movement of belt 30 is well known to those of skill in the art, and may, for example, be that disclosed in U.S. Pat. No. 3,910,570, incorporated herein by reference.

Original document stack 34 is shown with its top documents "shingled" to the left, so as to overlap a stationary metallic plate 35 which spans the entire length of the stack (the length of the stack is defined as that dimension perpendicular to the plane of FIG. 1).

In the transient position of FIG. 2, the bottom of this stack is supported by the two pairs 36 and 37 of three rods each. In the position shown in FIG. 2, rods 36, 37 operate to elevate the stack. In this position the stack is spaced from a sheet-receiving platform defined by stationary plates 38 and 39. Rods 36, 37, plates 38, 39, and belt 30 span the entire length of stack 34.

Assume for the moment that a just-copied document is to be rejoined to stack 34. Motor 53 is energized to effect movement of rods 36, 37.

In so moving, each of the rods first moves from FIG. 2's dotted-line position to engage the middle portion of the bottom of the stack, as the rods pass through separation area 58 between platform portions 38 and 39. As rod movement continues, to the full-line position shown in FIG. 2, the stack is elevated, as shown, to define a lower area wherein a just-copied document can be inserted. Such a document is supplied to platform 38, 39 such that its right-hand edge abuts and is registered against now-closed gate 50. This document is rejoined to the stack by continued movement of rods 36, 37, rods 36 moving counterclockwise and rods 37 moving clockwise. To accommodate the movement of rods 36, gate 50 pivots clockwise about its pivot, thus allowing rods 36 to pass unobstructed. When rods 36, 37 have completed 360° of their movement, they are in the dotted-line position. Rods 36, 37 remain in this dotted-line position until it is necessary to again insert a just-copied document onto the bottom of stack 34.

During the time that stack 34 rests on platform 38, 39 combing wheel 40 is lowered into the top sheet of the stack, and clockwise rotation of this wheel is effective to move the left-hand edge of the top sheet to sensor 66, to thereby place this edge into the influence of the now-open sheet nip 62.

The opposite direction of movement of rods 36, 37 produces minimum movement force, or at least near equal and opposite movement force, on the bottom sheet of the document of the stack being lowered.

In order to transport a just-copied document onto platform 38, 39, it is necessary that gate 33 be opened, whereupon step movement of document belt 30, as above described, is effective to advance this document's right-hand leading edge to the driving influence of drive nip roller pair 59. The document is guided to drive nip 59 by way of spaced, curved metallic guide plates 60 and 61. Guide plates 60 and 61 span the entire length of the document.

As a just-copied document is being supplied to platform 38, 39, by operation of transport belt 30 and drive nip 59, the top document of stack 34 is being supplied to the document glass by operation of drive nip roller pair 62, spaced metallic guide plates 63 and 64, drive nip roller pair 65, and document transport belt 30.

If desired, closeable drive nip 62 may include a well known separator/restraint roller pair whereby the upper roller always rotates in the forward-feed direction, whereas the lower roller will rotate in a forward direction only in the presence of a single sheet in nip 62. If a double-sheet feed occurs, the lower roller rotates in the reverse-feed direction to hold back the unwanted second sheet. An example of such a separator/restraint roller pair used in an RADF as described is shown in U.S. Pat. No. 3,861,671, incorporated herein by reference.

After the trailing edge of the document being fed to platform 38, 39 has cleared gate 33, this gate closes, such that the leading edge of the document being fed onto the document glass can be registered against this gate by operation of transport belt 30.

Gate 33 is preferably open most of the time, and is closed only momentarily during the latter portion of the time period of operation of belt 30. Specifically, the period during which the gate remains closed is terminated by sheet sensor 67 which senses the arrival of the leading edge of a new sheet at a position prior to gate 33. This sensor may, for example, be of a photoelectric or pneumatic type.

Above-mentioned combing wheel 40 is operable to "stage" the leading edge of the top document in stack 34 at the position of stationary sensor 66. This sensor may also be of a photoelectric or pneumatic type which, in either case, operates to sense the presence of a document's leading edge, and to control up/down movement 41 of combing wheel 40, causing the combing wheel to be elevated off of the stack when a document is so detected. Subsequently, when it is desired to feed this sheet onto the document glass, combing wheel 40 is again lowered onto the stack and its shingling affect on the stack is operable to move the top sheet of the stack into now-closed drive nip 62.

Combing wheel 40 is forced down upon stack 34 while stack rests on platform portion 38. As a result, clockwise rotation of combing wheel 40 produces stack shingling to the left, as shown.

The construction and arrangement whereby combing wheel 40 is raised and lowered, as shown by double-headed arrow 41 will be apparent to those skilled in the art. However, by way of example, one such solenoid actuated construction and arrangement is shown in U.S. Pat. No. 4,089,516, which is incorporated herein by reference, for example the arrangement shown in FIG. 14 of that patent. This patent also shows an example of combing wheel 40's construction.

Figure 3:
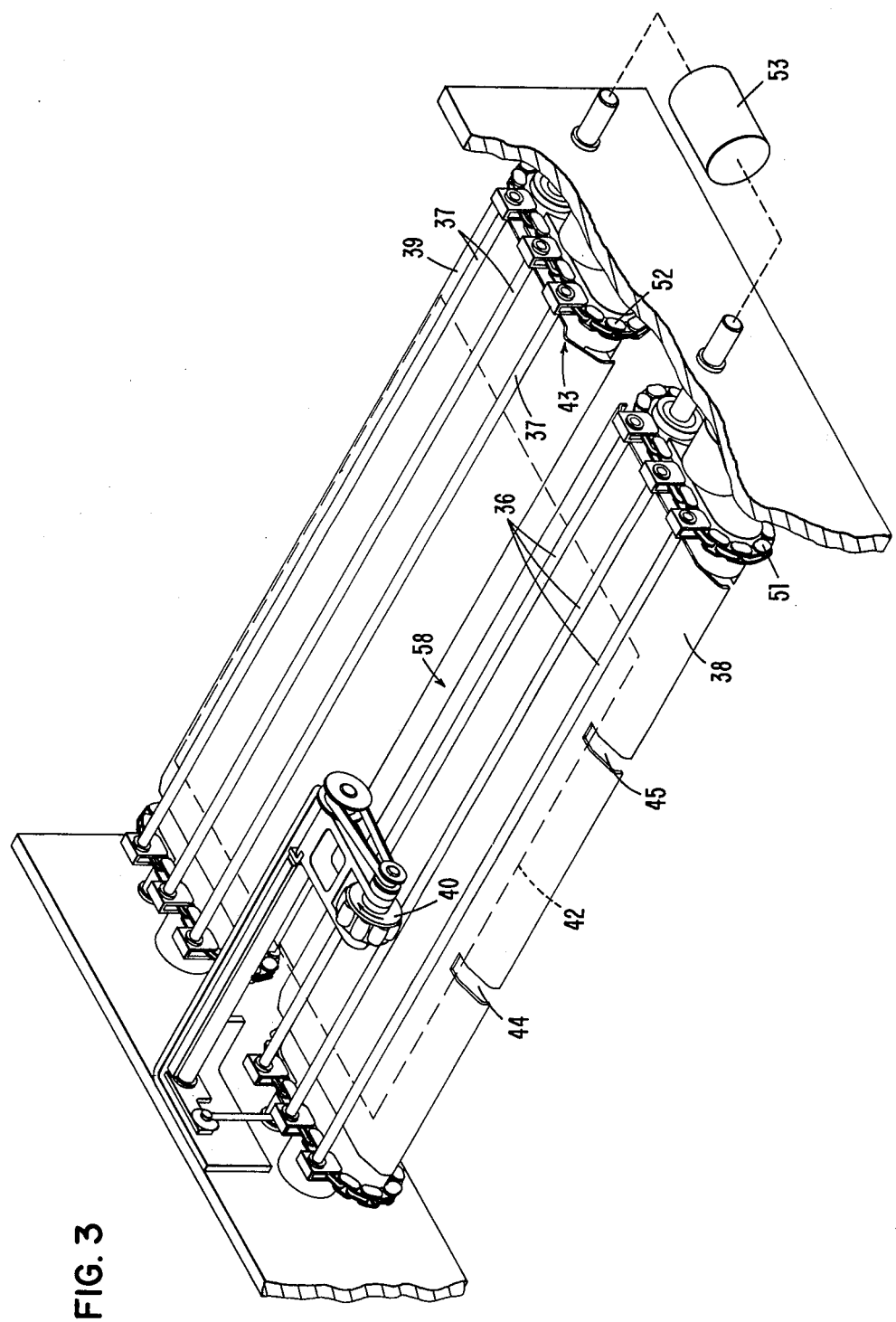
FIG. 3 is a detailed perspective view of a portion of the device of FIGS. 2 and 5.

FIG. 3 discloses the construction and arrangement of FIG. 2's platform 38, 39 as well as rods 36, 37 in greater detail. From FIG. 3 it can be seen that paths 51, 52 are defined by two pairs each of chains which support rods 36, 37. A sheet 42 is shown in broken lines resident on platform 38, 39. Portion 39 of this platform includes a raised portion 43 which operates to insure that the leading edge of sheet 42 will successfully bridge gap 58 between platform portions 38 and 39. Portion 38 of this platform includes two cutaway portions 44 and 45 which receive FIG. 2's gate 50.

The specific means for controlling the apparatus of FIG. 2, as described, will be apparent to those of skill in the art and such a specific means is not pertinent to this invention. The art teaches the use of relays, combinational logic and microprocessors, as well as various combinations thereof.

Figure 4:
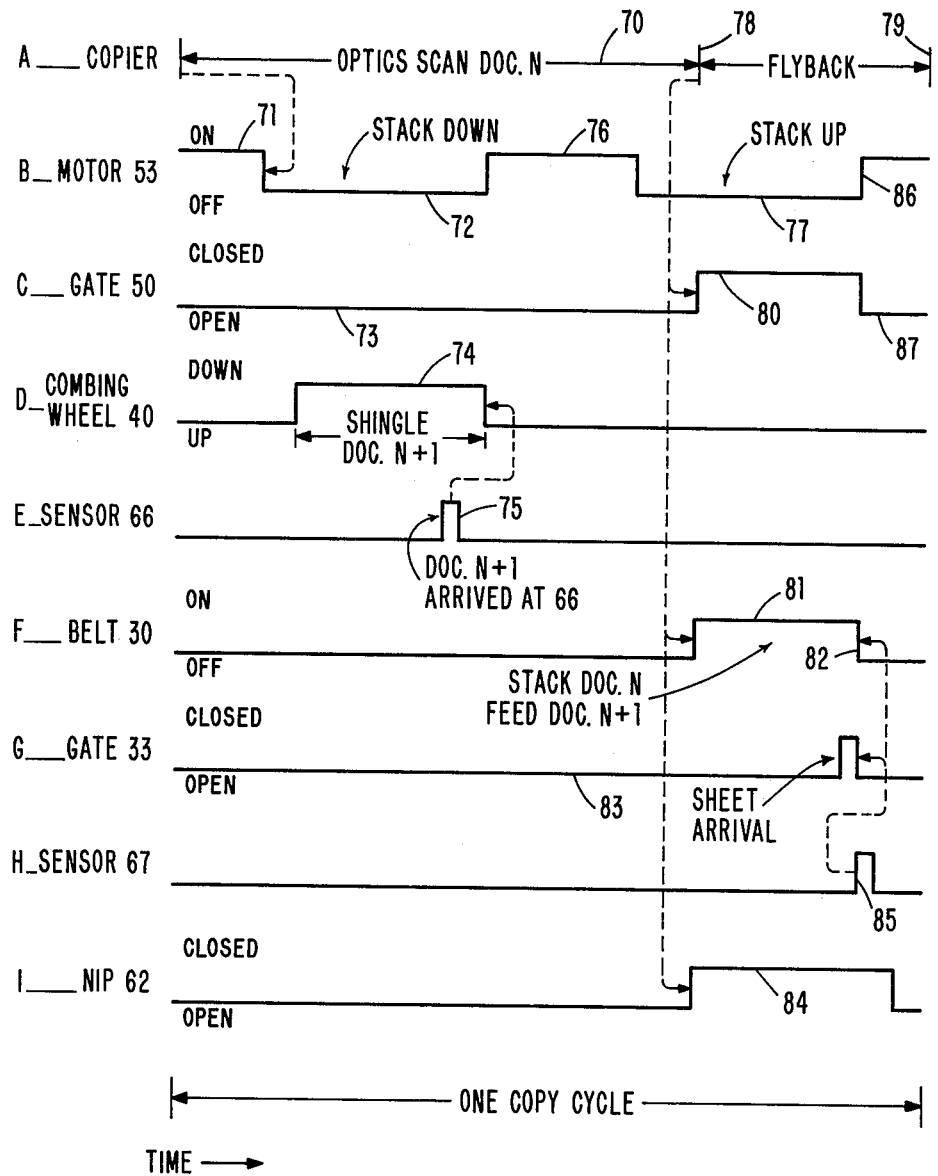
FIG. 4 is a timing chart defining the operation of the apparatus of FIG. 2.

FIG. 4 is believed to be an enabling teaching to those of skill in the art and defines the sequence of operation by reference to relative timings of the arrangements of FIGS. 1 and 2.

With reference to FIG. 4, assume that document N is currently resident on the copier's document glass. The document on platform 38, 39 is therefore document N−1, and the stack's top document is N+1. With the exemplary copier of FIG. 1, document N is scanned, for example once, as indicated at 70 of FIG. 4. During this scan time, FIG. 2's motor 53 is energized (71 of FIG. 4) to lower the stack onto document N−1 (72 of FIG. 4). In order to allow rods 37 to pass from FIG. 2's full-line position to the dotted-line position, gate 50 is opened (73 of FIG. 4). Also, combing wheel 40 is lowered onto the top sheet of the stack (74 of FIG. 4) and document N+1 is shingled to sensor 66 (75 of FIG. 4).

Motor 53 is now again energized (76 of FIG. 4) until rods 36, 37 reach their full-line position (77 of FIG. 4). During FIG. 4's time interval 78, 79 the copier's scan optics returns to the beginning of scan position. At time 78 gate 50 closes (80 of FIG. 4), and document transport belt 30 begins the movement of document N (81 of FIG. 4) through open gate 33 (83 of FIG. 4).

During time interval 81, 82 document N is being restacked and document N+1 is being fed onto the copier's document glass.

Feed of document N+1 occurs by the closing of nip 62 (84 of FIG. 4). Document N+1 is sensed by sensor 67 (85 of FIG. 4), and the sensing of this event opens gate 33 and stops belt 30.

Considering the simultaneous stacking of document N, since stack 34 is now elevated above platform portions 38, 39 the movement of belt 30 during above-described time interval 81, 82 causes just-copied document N to be registered against the now-closed gate 50 (80 of FIG. 4). After this has occurred, and at time 86, motor 53 is again energized and stack 34 is lowered onto document N, as rods 36 move through now-open gate 50 (87 of FIG. 4).

Figure 5:
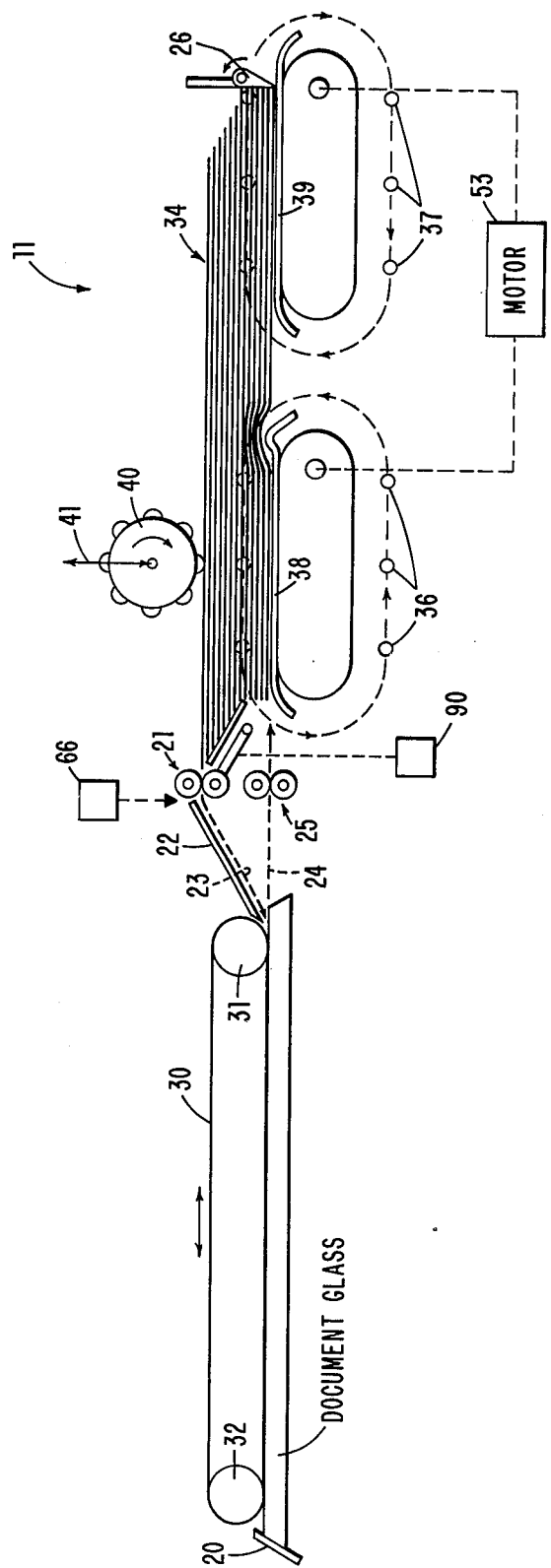
FIG. 5 is a front view of a second embodiment of the present invention, which embodiment also uses the arrangement of FIG. 3.

FIG. 5 discloses another embodiment of the present invention. The same reference numerals are used in this figure to designate elements common to FIGS. 1, 2 and 3.

In the arrangement of FIG. 5, RADF 11 is located to the right side of the copier's document glass. The top sheet of stack 34 is fed to drive nip roller pair 21 and is guided to transport belt 30 by fixed-position metallic guide plate 22, the sheet following path 23. Guide plate 22 extends at least the length of the document being fed. Nip 21 is shown closed, and is selectively opened and closed by acutator 90.

Drive nip 21 may also comprise the above-described separator/restraint roller pair.

Platen transport 30 of FIG. 5 operates to move an original document right-to-left to register the document against fixed-position registration stop 20, for copying. When the document has been imaged onto the copier's photoconductor, transport belt 30 is reversed, and the document is returned to the bottom of stack 34. The construction and arrangement of reversible belt transport 30 has not been specifically described since it is well known to those of skill in the art. By way of example, U.S. Pat. No. 3,829,082 discloses such a construction and arrangement, and this patent is incorporated herein by reference.

A just-copied document returns to stack 34 while following path 24 which includes drive nip roller pair 25. This document is placed on platform 38, 39 while stack 34 is held in an elevated position by rods 36, 37 in their dotted line FIG. 5 position. Gate 26 is closed at this time, and functions the same as does FIG. 2's gate 50; i.e., in the closed position, the gate serves to locate the returned document's leading edge, and in the open position, the gate allows rods 37 to pass through on their way to FIG. 5's lower, full line position.

In the embodiments shown, platform 38, 39 defines a generally horizontal platform adapted to receive a stack of original documents for copying. In FIG. 2 this platform is above the copier's document glass, whereas in FIG. 5 this platform is positioned to the side of the document glass.

Combing wheel 40 cooperates with the top sheet of this stack and comprises a portion of the means which is operable to feed this top document to the copier's document glass for copying. As is well known, combing wheel 40 uniquely insures single-sheet feeding. In both embodiments, the indicia to be copied faces down while resident on the document glass.

The stack lowering/elevating means, including rods 36, 37, operates cyclically to lower and raise the stack, which in the raised position allows a document to be placed on platform 38, 39 by operation of a second document feed means; i.e., belt 30 and drive nip 59 of FIG. 2, and belt 30 and drive nip 25 of FIG. 5.

In the arrangement of FIG. 2, a simplex original document stack 34 is placed with the side to be copied facing up and in page sequence 1, 2 . . . N top to bottom. In FIG. 5, simplex original document stack 34 is placed with the side to be copied facing down and in page sequence N . . . 2, 1 top to bottom. In both cases, the output copy sets are stacked in the proper 1, 2 . . . N page sequence with the indicia side facing up or down, as desired.

Figure 6:
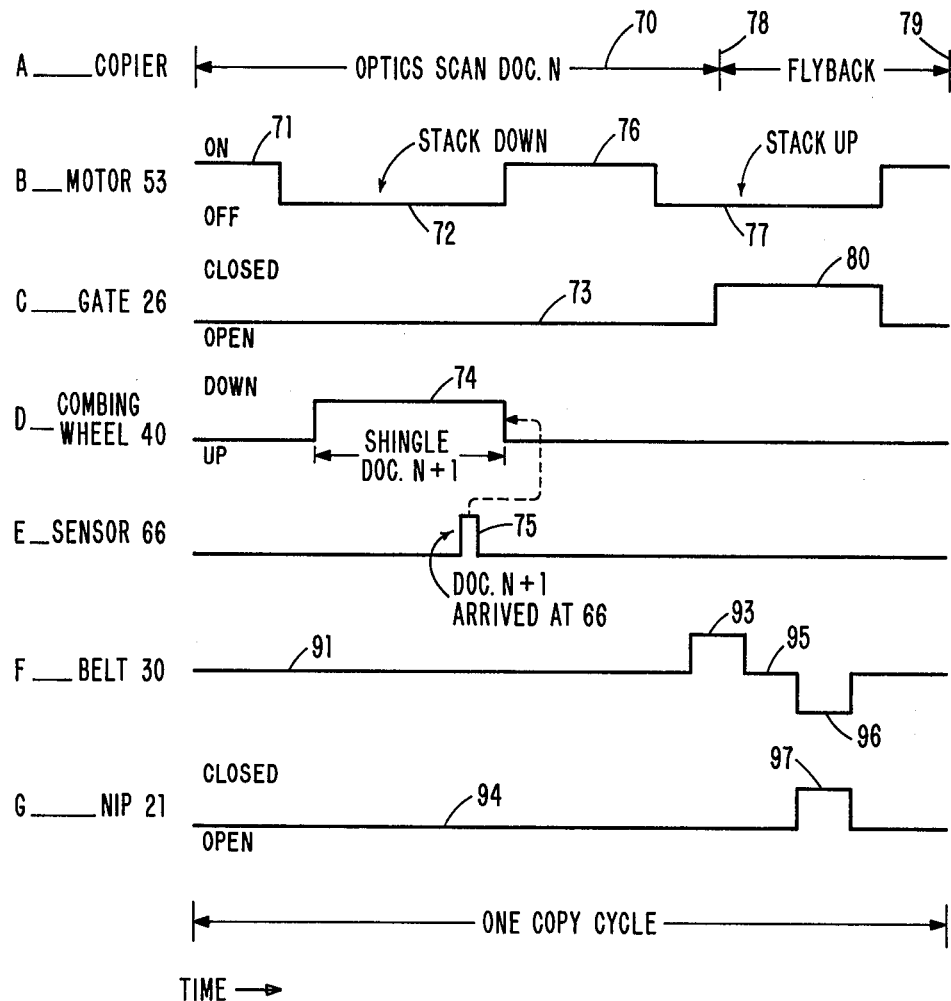
FIG. 6 is a timing chart defining the operation of the apparatus of FIG. 5.

FIG. 6 describes the sequence of operation of the apparatus of FIG. 5. Specific means will be apparent to those of skill in the art and as is well known may comprise relays, combinational logic and microprocessors, as well as combinations thereof.

With reference to FIG. 6, the copier's scan/flyback copy cycle interval is again identified by 70, 78, 79. During the scan interval, document N is resident on the copier's document glass for copying, document N+1 is the top document of stack 34, and document N−1 has been returned to platform 38, 39 during the previous flyback interval.

Belt 30 is stationary during the scan interval (91 of FIG. 6). At the beginning of scan, motor 53 is energized (71 of FIG. 6), gate 26 is open (73 of FIG. 6), and rods 36, 37 move to their lower full line position of FIG. 6. As a result, motor 53 is deenergized (72 of FIG. 6). Document N−1 now has rejoined the stack as the bottom document.

Combing wheel 40 now moves down onto document N+1 (74 of FIG. 6) and this document's left-hand edge is moved to now-open nip 21 (94 of FIG. 6) and is sensed by sensor 66 (75 of FIG. 6). As a result of this sheet sensing, combing wheel 40 is lifted off the stack.

Motor 53 is now again energized (76 of FIG. 6), causing rods 36, 37 to continue on their respective paths 51, 52 to the upper dotted-line position of FIG. 6, whereupon motor 53 is again deenergized (77 of FIG. 6).

At the end of the copier's scan interval (78 of FIG. 6), belt 30 moves in a counterclockwise direction about its support/drive pulleys 31, 32 (93 of FIG. 6). This direction of belt movement is defined as the reverse direction. As a result, the right-hand edge of document N is brought into the influence of drive nip 25. This drive nip inserts document N under raised stack 34 and registers the document's right-hand edge against closed gate 26 (80 of FIG. 6).

Belt 30 now stops (95 of FIG. 6) and then moves in the clockwise direction about its pulleys 31, 32 (96 of FIG. 6). This direction is defined as the forward direction. At or shortly prior to this time nip 21 closes (97 of FIG. 6). As a result, document N+1 is transported to the copier's document glass and is registered against stop 20 for copying, whereupon nip 21 opens and belt 30 stops.

It is desirable to provide a means whereby the copier's control apparatus will know when a stack of original document sheets have been completely circulated and copied, and that the next sheet to be copied is a return of the first sheet of the original document set to be again copied. As is well known to those of skill in the art, one means, of course, would be for the operator to simply count the original document sheets and to provide this number as an input to the copier. The RADF would then feed document sheets and count them to define copy sets. U.S. Pat. No. 3,499,710, incorporated herein by reference, teaches another means, such as a metal-like sheet, which comprises the last sheet of a document. This metal sheet is sensed as an indication of the completion of copying of the original document set. A copy of this metal sheet can be made to act as a separator sheet where all copy sets are stacked in one output copy tray. U.S. Pat. No. 3,565,420, incorporated herein by reference, teaches the use of a movable bail or separator bar which separates the returned original sheets of a set, after copying, from those sheets yet to be copied. At the beginning of copying, this rod is on a first side of the original document set. As copying proceeds, the bar works its way through the set to the other side, thus indicating completion of one recirculation of the original document set. The bar then resets to the first side of the set. U.S. Pat. No. 4,076,408, incorporated herein by reference, is similar in that it teaches the use of a pivoted separator member or finger which extends into the supply hopper or tray for the original document set. This finger operates to separate the sheets into those which have been copied and those which remain to be copied. When this finger reaches the side of the set toward which it incrementally steps, one sheet at a time, it swings through an arc greater than 180° to again sit on the other side of the set, thus indicating completion of one recirculation of the original document set.

While the invention has been particularly shown and described with reference to preferred embodiments thereof, it will be understood by those skilled in the art that various changes in form and details may be made therein without departing from the spirit and scope of the invention.

What is claimed is:

1. A recirculating automatic document feed for use with a copier having a generally horizontal platen whereat a stationary original document is viewable for copying, comprising:
    a generally horizontal platform adapted to receive a stack of original documents to be copied;
    first document feed means adapted to cooperate with the top document of the stack and to feed said top document to position the document on said platen for copying;
    cyclically operable stack elevating means cooperating with said platform and constructed and arranged to elevate the original document stack a distance above said platform, thereby leaving said platform unobstructed to allow placement of a document onto said platform under the elevated stack; and
    second document feed means adapted to cooperate with a document on said platen and to feed such a copied document to place the copied document on said platform under the elevated stack;
    said stack elevating means thereafter lowering the stack, and subsequently reelevating the stack, including the copied document.

2. The document feed defined in claim 1 wherein said first document feed means is operable to feed the stack's top document when the stack is in the lowered position.

3. The document feed defined in claim 2 wherein said first document feed means is operable to stage the stack's second from the top document adjacent said platen as the stack's top document is being copied.

4. The document feed defined in claim 3 wherein said first document feed means is a combing wheel.

5. The document feed defined in claim 4 wherein said first document feed means includes a separator/restraint means operable to reject undesirable feed of more than one document at a time to said platen.

6. The document feed defined in claim 5 wherein said platform is located vertically above said platen, wherein said first document feed means operates to feed said top document down around a generally 180° bend so as to position the document on said platen, and wherein said second document feed means operates to feed such a copied document up around a generally 180° bend so as to place the copied document on said platform under the elevated stack.

7. The document feed defined in claim 6 wherein a document is viewable from below for copying its underside.

8. A method of producing collated sets of copy sheets from a precollated, multisheet original document stack, which stack is copied in repeated cycles; comprising the steps of: supporting said stack on a support platform; feeding said original document, one sheet at a time, from the top of said original document stack, to an exposure station for copying; moving said stack away from said support platform to provide an unobstructed space on said support platform; returning each original document sheet, in sequence, to its original seriatim position in the stack, by feeding from said exposure station to said unobstructed space on said support platform; and thereafter lowering said stack to said support platform.

9. The document feed defined in claim 1 wherein
    said platform comprises a generally horizontal, two-portion platform, said two portions being spaced to define an unobstructed separation generally at a midportion of the stack;
    said stack elevating means comprises a pair of recirculating platform means adapted to simultaneously occupy a first position wherein each of said platform means is below each of said platform portions, and movable through said unobstructed separation to a second position wherein each of said platform means is above each of said platform portions; and motive means coupled to said pair of platform means such that in said second position a document may be inserted on said two-portion platform, and in said first position such an inserted document joins the stack at the bottom thereof.

10. The document feed defined in claim 9 wherein said recirculating platform means moves from said second to said first position while moving in generally circular paths, the opposite extremities of said circular paths spanning a distance greater than the distance spanned by said two-portion platform.

11. The document feed defined in claim 10 wherein said recirculating platform means comprises two pairs of circular endless bands or chains which each support a plurality of stack-supporting rod-like members, each of said pair of said bands encircling the ends of one of said portions of said platform and being spaced a distance greater than the like length of a document, the opposite extremities of said bands being spaced a distance greater than the orthogonal length of a document, and the adjacent extremities of said bands coinciding with said unobstructed separation.

* * * * *